United States Patent Office 3,499,620
Patented Mar. 10, 1970

3,499,620
AIRCRAFT POWER PLANT
Joseph A. Erich Haberkorn, Riemerling, Rolf G. Sturm, Munich, and Hans Weidinger, Ottobrunn, Germany, assignors to Entwicklungsring Sud G.m.b.H., Munich, Germany
Filed Dec. 26, 1967, Ser. No. 693,226
Claims priority, application Germany, Jan. 18, 1967, E 33,235
Int. Cl. B64d 27/12, 27/14; B64c 29/00
U.S. Cl. 244—55                          4 Claims

ABSTRACT OF THE DISCLOSURE

The described apparatus concerns a power plant for a vertical take-off and landing aircraft which allows maximum utilization of fuselage storage space. The lift fans of the aircraft are connected by tubing to the output of several gas generators which are mounted upon the exterior surface of the upper wall of the fuselage. Means are provided for selectively lowering the gas generators into the fuselage when desired. The generators together with their connecting conduit are covered by a suitable protective shell.

BACKGROUND OF THE INVENTION

This invention generally relates to a power plant adapted for use with a vertical take-off and landing aircraft. The power plant includes lift fans driven by gas generators connected thereto by suitable piping.

Conventionally, lift fans are positioned in the wings or adjacent the fuselage of the aircraft and are adapted to be extended out of the fuselage, tilted with respect to the fuselage, or positioned within the fuselage. In order to keep the moment of inertia of the aircraft as low as possible, it is advisable to locate the gas generators proximate the gravitational center of the aircraft. However, such a concentration of generators close to the center of gravity of the aircraft results in a considerable reduction in available fuselage space. When so located, the gas generators and connecting pipes occupy valuable space that could otherwise be devoted to cargo.

With respect to the illustrated embodiment, the gas generators as well as the connecting pipes which lead to the lift fans are suppored upon the exterior top surface of the fuselage support structure. The gas generators and gas pipes so located are covered by a protective shell. It is an additional feature of the illustrated embodiment to provide means for lowering the gas generators from the upper exterior surface of the fuselage to the interior thereof. To faciiltate such lowering, the gas generators are supported by cables. In their exterior position, the gas generators are detachably secured and rotatably supported by support arms mounted directly above and transverse to the frame of the fuselage.

It is a main object of this invention to provide an improved power plant for an aircraft which permits a more efficient utilization of fuselage space. Other objects and advantages of the invention will become apparent with reference to the following description and accompanying drawings which show an illustrative embodiment of this invention.

DESCRIPTION OF THE EMBODIMENTS

Figure 1:
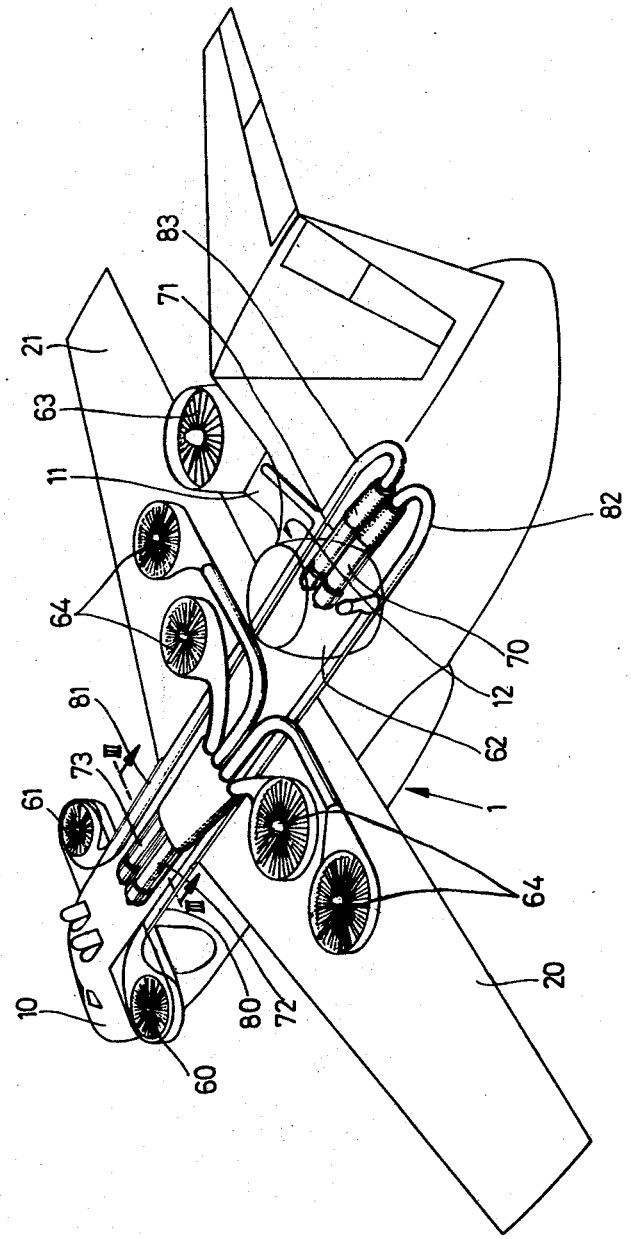
FIGURE 1 is a perspective view of an aircraft having a power plant including certain features of this invention with a portion thereof removed for clarity of illustration.

With particular reference to FIGURE 1, an aircraft 1 is illustrated which is provided with a pair of lift fans 60 and 61 hingedly mounted adjacent the forward end of a fuselage 10 of an aircraft. Additional fans 62 and 63 are mounted at the sides of the fuselage 10 upon a pair of rotatable support arms 11 and 12, respectively. The fans 62 and 63 serve as either lift or propulsion fans depending on their rotational position with respect to the axis of the fuselage. Lift fans 64 and 64b are installed in the wings 20 and 21, respectively. Serving to supply power to the lift fans 60, 62 and 61, 63 are gas generators 70 and 71 mounted slightly forward of the tail of the fuselage. The lift fans 64 and 64b are supplied by gas generators 72 and 73, respectively.

Figure 3:
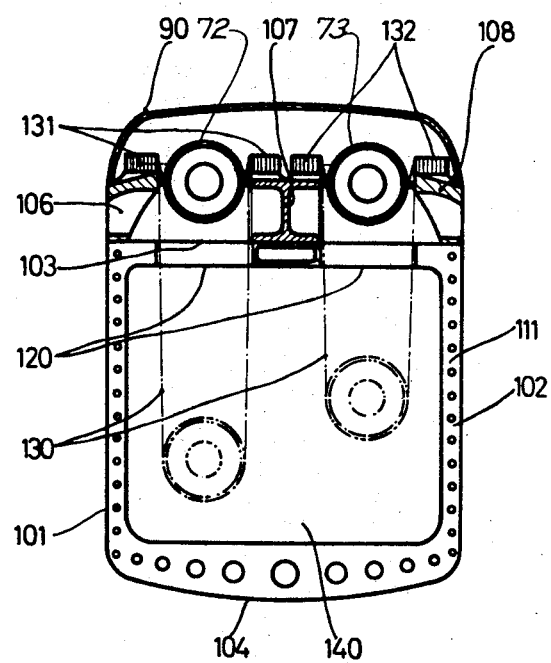
FIGURE 3 is a sectional view taken substantially along the line III—III of FIGURE 1.

With particular reference to FIGURE 3, the fuselage 10 is substantially rectangular in cross section and comprises parallel disposed side walls 101 and 102, an upper wall 103, and a bottom wall 104. Positioned above the wall 103, exterior to the fuselage, are inwardly projecting support arms 106 and 108. The support arms 106 and 108 cooperate with a support arm 107 also located above the upper wall 103 and between the arms 106 and 108 for support of the gas generators 72 and 73, as will subsequently be described. The gas generators 70 and 71 are supported in a similar manner slightly forward of the tail section of the fuselage. The upper wall 103 defines a pair of openings 120 through which the gas generators are selectively lowered to the interior 140 of the fuselage, as shown in phantom in FIGURE 3.

Serving to position the generator 72 is a pair of winches 131, and, correspondingly, a pair of winches 132 serve to position the generator 73. The winches 131 and 132 are mounted upon the support arms 106, 107, and 108. The generators are suspended from their respective winches by supporting cables 130.

Gas pipes 80, 81, 82, and 83 are provided for feeding the fans 60, 61, 62 and 63 and are also positioned on the upper side of the top wall of the fuselage. The gas pipes 80, 81, 82, and 83 are covered with a protective, nonstressed shell 90 which is shaped in accordance with well-known aerodynamic principles. Under certain circumstances, it may be desirable to provide individual shells for the gas generators and pipes, rather than cover both with a common shell.

Figure 2:
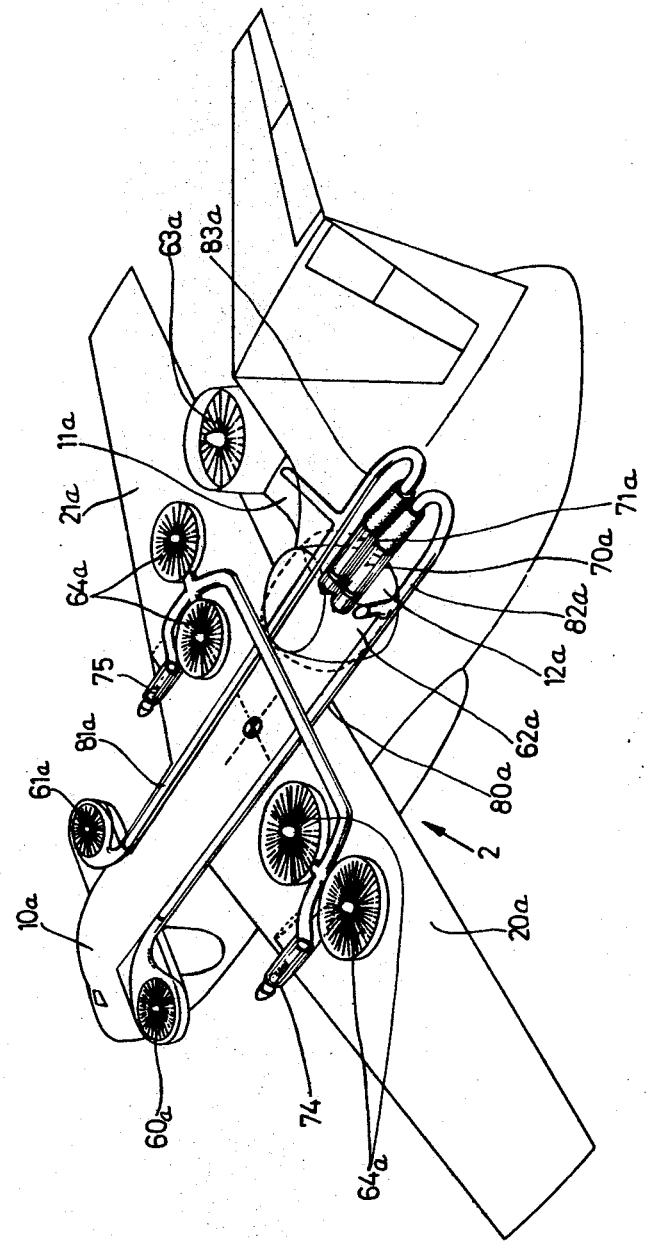
FIGURE 2 is a perspective view of an alternate embodiment of an aircraft having a power plant including certain features of this invention with a portion thereof removed for clarity of illustration.

With reference to the alternate embodiment illustrated in FIGURE 2, the elements which correspond with those of FIGURES 1 and 3 are designated with the suffix a. An aircraft 2 is illustrated having a pair of gas generators 74 and 75 which supply the lift fans 64a. The generators 74 and 75 are mounted directly upon the wings 20a and 21a or may alternatively be mounted within the wing. The fans 64a are fed through a duct 76 connected to the output of the generators 74 and 75.

It should be noted that due to the fact that the gas generators and the gas pipes are positioned upon the exterior of the fuselage, the interior thereof is fully available for cargo. A further advantage of the illustrated embodiment is that the gas generators, as well as the gas pipes to which they are connected are not housed inside the closed, air-conditioned fuselage of the aircraft. This feature is particularly desirable during extreme weather conditions. Further, upon removal of the protective shell 90, the pipes are readily accessible for maintenance.

Although two embodiments of the invention have been described in detail, it is to be understood that various

What is claimed is:

1. A power plant adapted for use in cooperation with an aircraft including a fuselage comprising at least one fan affixed to the frame of the aircraft, at least one gas generator supported upon the exterior surface of said fuselage, connecting pipes connecting the output of said gas generator to said fan, said gas pipes being secured upon the exterior surface of the top wall of the fuselage and a nonstressed protective shell covering a portion of said gas generator and said gas pipe.

2. A power plant in accordance with claim 1 wherein said fuselage defines an opening in said top wall thereof under said gas generator, and means for selectively positioning through said opening said gas generator between a first position exterior to the fuselage compartment and a second position within the fuselage compartment.

3. A power plant in accordance with claim 2 wherein said positioning means includes at least one cable one end of which is secured to said generator.

4. A power plant in accordance with claim 3 which further comprises a support arm mounted upon the exterior surface of said fuslage and extending along an axis substantially transverse to the axis of the fuselage and a winch mounted upon said support arm, the free end of said cable being secured to said winch so that an actuation of said winch will result in a corresponding movement of said generator.

References Cited

UNITED STATES PATENTS

| | | | |
|---|---|---|---|
| 2,973,921 | 3/1961 | Price | 244—12 |
| 3,028,130 | 4/1962 | Burton | 244—137 |
| 3,084,888 | 4/1963 | Hertel | 244—23 |
| 3,139,244 | 6/1964 | Bright | 244—12 |

FOREIGN PATENTS

| | | |
|---|---|---|
| 1,006,380 | 1/1952 | France. |
| 1,105,666 | 12/1968 | Great Britain. |

MILTON BUCHLER, Primary Examiner

JAMES E. PITTENGER, Assistant Examiner